United States Patent
Zhou

(10) Patent No.: US 10,409,973 B2
(45) Date of Patent: Sep. 10, 2019

(54) METHOD FOR CONTROLLING UNLOCKING AND TERMINAL DEVICE

(71) Applicant: Guangdong Oppo Mobile Telecommunications Corp., Ltd., Dongguan, Guangdong (CN)

(72) Inventor: Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/989,042

(22) Filed: May 24, 2018

(65) Prior Publication Data
US 2019/0138703 A1    May 9, 2019

Related U.S. Application Data

(63) Continuation of application No. 15/590,508, filed on May 9, 2017.

(30) Foreign Application Priority Data

May 30, 2016  (CN) .......................... 2016 1 0375436

(51) Int. Cl.
   *G06F 21/32*   (2013.01)
   *G06K 9/00*    (2006.01)
   *G06F 1/16*    (2006.01)
(52) U.S. Cl.
   CPC ............ *G06F 21/32* (2013.01); *G06F 1/1692* (2013.01); *G06K 9/0002* (2013.01);
   (Continued)

(58) Field of Classification Search
   USPC ................. 345/174; 348/208.4, 208.14, 251; 382/115, 124, 132, 203
   See application file for complete search history.

(56) References Cited

U.S. PATENT DOCUMENTS 6,970,584 B2   11/2005   O'Gorman et al.
6,990,219 B2    1/2006   Morimura et al.
(Continued)

FOREIGN PATENT DOCUMENTS

CN         1822013 A      8/2006
CN       101901336 A     12/2010
(Continued)

OTHER PUBLICATIONS

Extended European search report issued in corresponding European application No. 17169802.0 dated Sep. 19, 2017.
(Continued)

*Primary Examiner* — Xuemei G Chen
(74) *Attorney, Agent, or Firm* — Young Basile Hanlon & MacFarlane, P.C.

(57) ABSTRACT

A method for controlling unlocking is provided. The method includes the following operations. M first fingerprint images are received when a touch operation of a finger of a user on a fingerprint recognition module of a terminal device is detected. N second fingerprint images are received based on N sets of capacity auto control (CAC) parameters when the finger of the user is in a steady state. A first target fingerprint image is determined and a matching process on the first target fingerprint image is performed. The terminal device is unlocked when the first target fingerprint image is matched.

12 Claims, 8 Drawing Sheets

(52) U.S. Cl.
CPC ....... *G06K 9/0004* (2013.01); *G06K 9/00087* (2013.01); *G06K 9/00114* (2013.01)

(56) References Cited

U.S. PATENT DOCUMENTS

| | | | |
|---|---|---|---|
| 7,050,609 B2 | 5/2006 | Huang | |
| 7,190,816 B2* | 3/2007 | Mitsuyu | G06K 9/00026 382/124 |
| 7,239,227 B1 | 7/2007 | Gupta et al. | |
| 7,366,331 B2* | 4/2008 | Higuchi | G06K 9/00046 340/5.53 |
| 8,779,780 B1 | 7/2014 | Peterson et al. | |
| 8,937,666 B1* | 1/2015 | Padala | H04N 5/23293 348/208.14 |
| 8,982,097 B1 | 3/2015 | Kuzo et al. | |
| 9,076,027 B2* | 7/2015 | Miura | G06K 9/00087 |
| 9,390,306 B2 | 7/2016 | Minteer et al. | |
| 9,648,181 B2 | 5/2017 | Fujimoto | |
| 9,679,183 B2* | 6/2017 | Minteer | G06K 9/0002 |
| 2002/0181749 A1* | 12/2002 | Matsumoto | G06K 9/00006 382/125 |
| 2006/0034497 A1* | 2/2006 | Manansala | G06K 9/001 382/124 |
| 2006/0093192 A1 | 5/2006 | Bechtel | |
| 2006/0177113 A1* | 8/2006 | Wrage | G06K 9/00067 382/124 |
| 2007/0286464 A1* | 12/2007 | Jayanetti | G06K 9/00013 382/124 |
| 2007/0290124 A1 | 12/2007 | Neil et al. | |
| 2008/0267465 A1 | 10/2008 | Matsuo et al. | |
| 2009/0167908 A1* | 7/2009 | Mori | A61B 1/00009 348/251 |
| 2009/0244298 A1* | 10/2009 | Liu | H04N 5/144 348/208.4 |
| 2010/0054705 A1 | 3/2010 | Okamoto et al. | |
| 2011/0025835 A1 | 2/2011 | Higuchi | |
| 2012/0027309 A1* | 2/2012 | Oami | G06K 9/38 382/203 |
| 2012/0060123 A1 | 3/2012 | Smith | |
| 2014/0098058 A1* | 4/2014 | Baharav | G06F 3/0421 345/174 |
| 2014/0267659 A1 | 9/2014 | Lyon et al. | |
| 2015/0070137 A1 | 3/2015 | Minteer et al. | |
| 2015/0139524 A1* | 5/2015 | Choi, II | H04N 5/23238 382/132 |
| 2015/0169934 A1* | 6/2015 | Tsai | G06K 9/00033 382/115 |
| 2015/0178542 A1 | 6/2015 | Minteer et al. | |
| 2015/0310250 A1 | 10/2015 | Fenrich et al. | |
| 2016/0078274 A1 | 3/2016 | Tuneld et al. | |
| 2016/0314338 A1 | 10/2016 | Li et al. | |
| 2017/0019523 A1 | 1/2017 | Ueno et al. | |
| 2017/0032165 A1* | 2/2017 | Hansen | G06K 9/00067 |
| 2017/0091521 A1 | 3/2017 | Tieu | |
| 2017/0091522 A1* | 3/2017 | Setlak | G06T 7/0002 |
| 2017/0255830 A1* | 9/2017 | Chen | G11B 27/10 |
| 2017/0329463 A1 | 11/2017 | Kurisu et al. | |
| 2017/0330018 A1* | 11/2017 | Li | G06K 9/00067 |
| 2017/0371608 A1 | 12/2017 | Wasserman | |
| 2018/0032792 A1 | 2/2018 | Wang | |

FOREIGN PATENT DOCUMENTS

| | | |
|---|---|---|
| CN | 102479328 A | 5/2012 |
| CN | 102598052 A | 7/2012 |
| CN | 104036266 A | 9/2014 |
| CN | 104700016 A | 6/2015 |
| CN | 105005776 A | 10/2015 |
| CN | 105303172 A | 2/2016 |
| CN | 105335707 A | 2/2016 |
| CN | 105335739 A | 2/2016 |
| CN | 105550647 A | 5/2016 |
| CN | 106022068 A | 10/2016 |
| CN | 106055955 A | 10/2016 |
| CN | 106056081 A | 10/2016 |
| CN | 106203290 A | 12/2016 |
| EP | 1215620 A2 | 6/2002 |

OTHER PUBLICATIONS

International search report issued in corresponding international application No. PCT/CN2017/082911 dated Jun. 28, 2017.

Office Action 1 issued in corresponding European application No. 17169802.0 dated Aug. 21, 2018.

Office Action 1 issued in corresponding U.S. Appl. No. 15/590,508 dated Jun. 25, 2018.

* cited by examiner

METHOD FOR CONTROLLING UNLOCKING AND TERMINAL DEVICE

CROSS-REFERENCE TO RELATED APPLICATION(S)

This application is continuation of U.S. Ser. No. 15/590,508, filed on May 9, 2017, which claims priority to Chinese Patent Application No. 201610375436.8, filed on May 30, 2016, the contents of both of which are hereby incorporated by reference in their entireties.

TECHNICAL FIELD

The present disclosure relates to the field of electronic technology, and particularly to a method for controlling unlocking and a terminal device.

BACKGROUND

At present, the fingerprint recognition technology has become a standard configuration of mainstream terminals (such as smart phones, tablet PCs and other terminal equipment). Fingerprint recognition can be used for unlocking, waking, and other functions of the terminal; besides, fingerprint recognition is an important part of mobile payments. Fingerprint payment also puts forward higher requirements for security while providing users with convenience. Fingerprint recognition process can include feature extraction, data saving, and image matching. First, an original fingerprint image is acquired via a fingerprint recognition sensor, thereafter, the original fingerprint image undergoes preliminary processing so that it can be clearer, and then, the original fingerprint image matches a registered fingerprint template for minutiae. The terminal will be unlocked when matches.

"Unlocking time" refers to a time period from the fingerprint image is acquired by the terminal until system unlocking. The length of the unlocking time has become a competition point of products of terminal manufacturers, and how to shorten the unlocking time of the terminal has become a technical problem to be solved in the field.

BRIEF DESCRIPTION OF THE DRAWINGS

In order to illustrate the technical solutions of the implementations of the present disclosure more clearly, the drawings used in the description of the implementations will be briefly described, it will be apparent that the drawings described in the following are implementations of the present disclosure, and it will be apparent to those skilled in the art that other drawings can be obtained from the drawings without any creative work.

DETAILED DESCRIPTION

Figure 1:
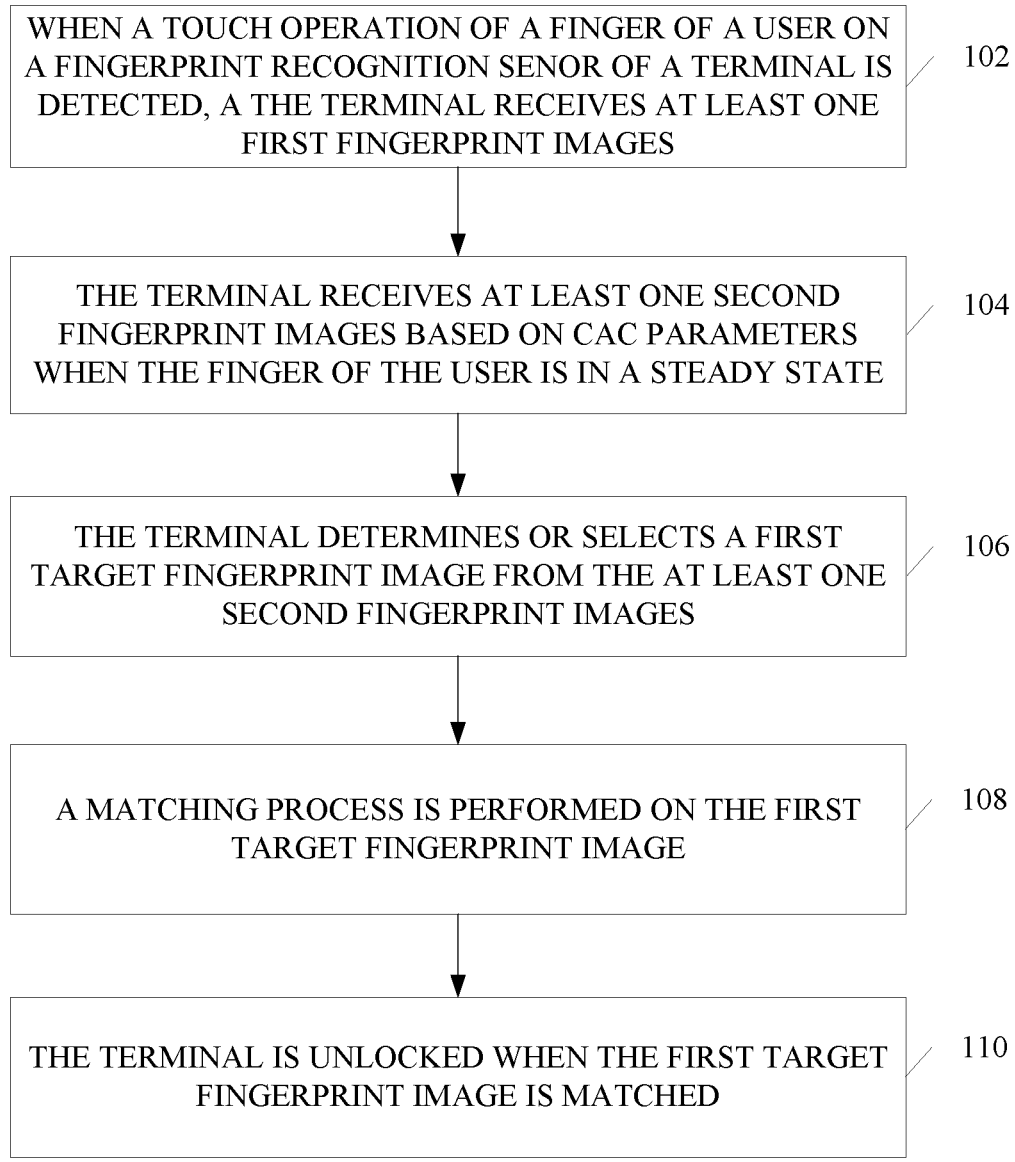
FIG. 1 is a flow schematic diagram illustrating a method for controlling unlocking according to an implementation of the present disclosure.

In order to provide a better understanding of the present disclosure for those skilled in the art, technical schemes of the implementations of the present disclosure will be described in the following description in conjunction with the accompanying drawings clearly and completely. Obviously, the described implementations are merely a part rather than all of the implementations of the present disclosure. All other implementations obtained by those of ordinary skill in the art based on the implementations of the present disclosure without creative labor should fall within the scope of the present disclosure.

The following will be described in detail.

The terms "first", "second", "third", and "fourth" used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

In the following, some of the terms used herein are explained to facilitate the understanding for those skilled in the art.

Terminal

Terminal, also known as terminal device, terminal equipment or user equipment (UE), means a device that provides voice and/or data connectivity to a user, examples of which includes hand-held devices with wireless connectivity function, on-board devices and the like. Common terminals include, for example, mobile phones, tablets, laptops, hand-held computers, mobile internet devices (MID), and wearable equipment such as smart watches, smart bracelets, and pedometers and so on.

Fingerprint Recognition Sensor

A fingerprint recognition sensor, also known as a fingerprint recognition module or fingerprint sensor, can realize the recognition of individual fingerprint features through a specific induction sensor. At present, the fingerprint recognition sensor is mainly divided into an optical fingerprint sensor, a capacitive fingerprint sensor, and a radio frequency (RF) fingerprint sensor. The fingerprint recognition sensor can be set in combination with a metal dome array (in other words, dome key) of a terminal, and can be set on the front surface, the race surface, or the side surface of the terminal, the present disclosure is not limited thereto. Similarly, the fingerprint recognition sensor can be set in combination with the touch screen of the terminal. For example, the fingerprint recognition sensor can be set below the touch panel of the touch screen.

Capacity Auto Control (CAC) Parameter

A CAC parameter includes "ADC shift or ADC offset", "ADC gain", and "pixel gain". "ADC shift" refers to the offset of an analog-to-digital converter (ADC).

Assume that the fingerprint recognition sensor includes 56*172 pixels, each pixel in a drawing process corresponds to a pixel value; that is, a total of 10,752 pixel values can be obtained, usually the size of these 10,752 pixel values is between 0.4 and 0.8 and the pixel values for most pixels are different, and then a distribution map can be formed. "ADC gain" refers to the gain of the ADC; the greater the gain, the more dispersed the distribution map, on the other hand, the smaller the gain, the more concentrated the distribution map; the more dispersed the distribution map, the higher the contrast of an image received, and originally darker pixels in the fingerprint image will be even darker while originally whiter pixels in the fingerprint image will be even whiter. "Pixel gain" refers to the gain of a pixel and is determined by a capacitor connected in parallel with an amplifier. The amplifier is connected in parallel with multiple capacitors and each of the capacitors can be controlled by a switch. The more the switch is closed, the greater the gain, the larger the pixel value, and the stronger the signal strength.

During a control process of the ADC, generally, the "pixel gain" is fixed, and therefore, the control process of the ADC is mainly used to adjust the "ADC shift" and the "ADC gain", among which the "ADC shift" is for adjusting the location of the whole distribution map, and the "ADC gain" is for adjusting the distribution or dispersion of the distribution map. Each finger is not the same, and the fingerprint recognition sensor can be used to debug captured images via different parameters. Assuming the "ADC shift" and the "ADC gain" each have five levels, the combination of these two can have 25 combinations, so the fingerprint recognition sensor can receive up to 25 fingerprint images each time.

Feature

Feature or characteristic refers to fingerprint features of a fingerprint image or a fingerprint recognition sensor; the fingerprint feature includes overall features and local features. The overall features in turn include basic pattern patterns such as loop, arch, and whorl. The local features, also known as minutiae, node, or feature point, generally refer to an individual portion of the fingerprint or information representative thereof. Two fingerprints often have the same overall features, however, their local features, that is, the minutiae, cannot be exactly the same. Prints of a fingerprint are not continuous, smooth, or straight, but often break, bifurcated, or curved. These break points, bifurcation points, and turning points are called "minutiae", which can provide confirmation information of the uniqueness of a fingerprint. Minutiae on a fingerprint have the following four different properties. 1) ending, means an end of a print; 2) bifurcation, means the splitting of a print into two or more than two prints; 3) ridge divergence, means the separating of two parallel prints; 4) dot or island, means a particularly short print that become a little dot; 5) enclosure, means a small ring formed when a print separated into two prints and these two prints immediately merged into one. Fingerprint feature data still includes the follows: 1) short Ridge, means a print which is short but not so short to be a little dot; 2) orientation, means that a minutiae point can toward a certain direction; 3) curvature, describes the speed at which the orientation of a print changes; 4) position, which is described via (x, y) coordinates, can be absolute, or can be inductively recognized relative to triangular points or minutiae.

ADC

The ADC can be built into a fingerprint recognition sensor, and can be used to convert analog signals of a fingerprint image into digital signals.

Wet Finger

Wet finger, also known as sweaty finer, that is, in the absence of exercise, some people's hands will sweat, commonly known as easy sweat body. In this case, the surface of the finger will have a lot of sweat, such finger will be called "wet finger".

Fingerprint Template

Figure 8:
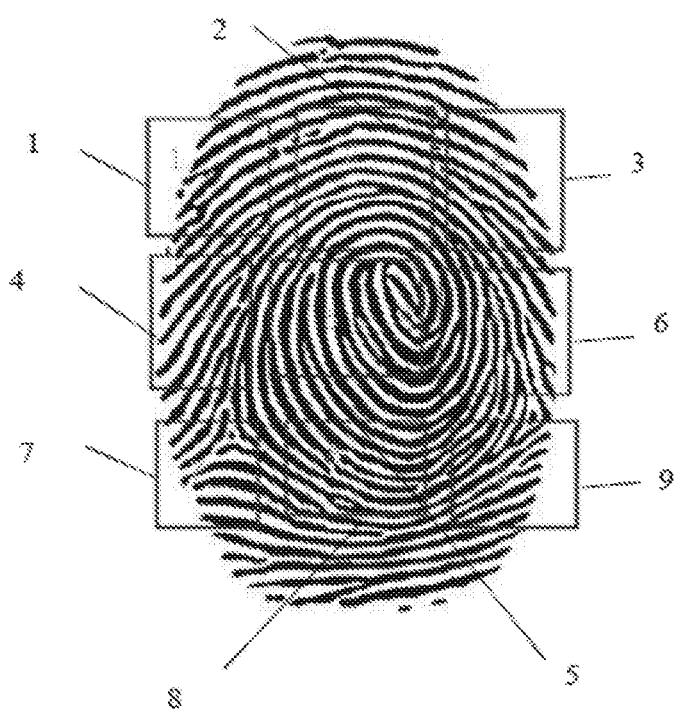
FIG. 8 is a schematic diagram illustrating a fingerprint template according to an implementation of the present disclosure.

The term "fingerprint template" and variants thereof, generally refers to a substantially complete fingerprint, or information representative thereof, collected from one or more nodes of a finger. For example, when a fingerprint function of a terminal such as a mobile phone is enabled for the first time, the user may be asked to undergo a fingerprint registration process; during the fingerprint registration, the user put his or her finger on a fingerprint sensor for fingerprint image acquisition or receiving by the fingerprint sensor, and the fingerprint image received will be stored as a fingerprint template, usually, one finger corresponds to one fingerprint template; generally, the fingerprint sensor may receive 10-20 times for each finger in order to receive the whole fingerprint face and generate a comprehensive fingerprint template. Feature information can be obtained from the fingerprint image received, and for example, the fingerprint template can be saved in the form of image. FIG. 8 illustrates an exemplary fingerprint template, and the numbers marked in the fingerprint of FIG. 8 refers to minutiae.

False Rejection Rate (FRR)

FRR refers to the percentage of recognition instances in which false rejection occurs, namely, refers to the probability of error that the same fingerprint is identified as a different fingerprint and rejected. FRR=(the number of fingerprints false rejected/the total number of fingerprints examined)*100%.

Fingerprint Image

Fingerprint image generally refers to images collected or received by the fingerprint recognition sensor; fingerprint image data, fingerprint image information, fingerprint data, or fingerprint information generally refers to information or data of the fingerprint image, and can be stored locally in the terminal such as stored in a database or memory built into the terminal. When we refer to receiving or collecting a fingerprint image, this can be understood as receiving fingerprint image information or fingerprint image data, or data required to generate or get a fingerprint image. When we refer to "receive" or "receiving" a fingerprint image, it means that a terminal, a fingerprint recognition sensor or a fingerprint recognition module, or other related components of the terminal can acquire, obtain, collect or in other manners get the fingerprint image.

Besides, the terms "a plurality of" or "multiple" means two or more than two. The term "and/or" is used to describe the association of associated objects and indicates that there can be three relationships. For example, "A and/or B" means three situations, that is, A alone, both A and B, or B alone. The character "/" generally indicates that the associated objects before and after the character are in an "OR" relationship.

In the following, technical solutions of the present disclosure will be described in detail.

According to one aspect of the present disclosure, there is provided a method for controlling unlocking of a mobile terminal. In this method, when a touch operation of a finger of a user on a fingerprint recognition sensor of a terminal is detected, at least one first fingerprint image is received or collected. When the finger is in a steady state, at least one second fingerprint image is received or collected. A target fingerprint image is selected from the at least one second fingerprint image, and the terminal will be unlocked when the target fingerprint image is matched.

FIG. 1 is a flow schematic diagram illustrating the method for controlling unlocking according to an implementation of the present disclosure. As illustrated in FIG. 1, the method can begin at block 102.

At block 102, when a touch operation of a finger of a user on a fingerprint recognition sensor of a terminal is detected, the terminal receives at least one first fingerprint image. For example, the terminal may receive M first fingerprint images, where M is a positive integer.

At block 104, the terminal receives at least one second fingerprint image based on CAC parameters when the finger of the user is in a steady state. As one implementation, the terminal may receive N second fingerprint images based on N sets of CAC parameters when the finger of the user is in the steady state, where N may be an integer greater than 1. For example, it can be determined, based on the at least one first fingerprint image, whether the finger of the user is in the steady state.

At block 106, the terminal determines or selects a first target fingerprint image from the at least one second fingerprint image. The first target fingerprint image is the best fingerprint image of the at least one second fingerprint images. For example, the first fingerprint image is a fingerprint image having the best clarity.

At block 108, a matching process is performed on the first target fingerprint image.

At block 110, the terminal is unlocked when the first target fingerprint image is matched.

For example, when the user presses the fingerprint recognition sensor, hand shake may occur while the user himself cannot feel. In this case, the fingerprint image received by the fingerprint recognition sensor can be vague, and this may affect the follow-up fingerprint comparison. Before receiving fingerprint images for unlocking, that is, the second fingerprint images, the terminal can first receive the first fingerprint images. The fingerprint images for unlocking will be obtained when the finger of the user tends to be stable. This prevents the fingerprint recognition sensor from obtaining a vague fingerprint image due to instability of the hand (in other words, hand shake) of the user, thereby avoiding the improvement of FRR of fingerprint recognition. Besides, the terminal is not required to receive the fingerprint image according to the parameter of a wet finger separately. The receiving time of fingerprint images may be saved and therefore fingerprint unlocking time may be shortened.

Alternatively, before receiving the at least one second fingerprint image based on the CAC parameters at block 104, the method illustrated in FIG. 1 may further includes the follows.

The terminal determines whether the finger of the user is in a steady state and whether the finger of the user is a wet finger according to the received at least one first fingerprint image. As an implementation, the terminal may determine whether the finger is the wet finger during the process of determining whether the finger of the user is in the steady state, that is, these two operations can be performed in parallel.

When the finger of the user is the wet finger, the manner in which the at least one second fingerprint images are received based on CAC parameters at block 104 may be implemented as follows. Take N second fingerprint images as an example, N sets of CAC parameters corresponding to the wet finger are determined, and the N second fingerprint images are received based on the N sets of CAC parameters corresponding to the wet finger.

For example, in order to avoid the problem that the N second fingerprint images received by the fingerprint recognition sensor are unclear due to that the finger of the user is the wet finger, the terminal may determine whether the finger of the user is the wet finger before receiving the N second fingerprint images. When the finger of the user is the wet finger, the terminal may receive the N second fingerprint images based on the N sets of parameters corresponding to the wet finger, which may guarantee that the N sets of parameters received by the fingerprint recognition sensor are available, and the fingerprint recognition FRR may be reduced.

Wet Finger Determination

When M is an integer greater than 1 (M>1), the manner in which the terminal determines whether the finger of the user is a wet finger based on the M first fingerprint images may be implemented as follows.

Manner 1

The terminal determines a second target fingerprint image, and the second target fingerprint image is the best fingerprint image of the at least one first fingerprint image (such as the M first fingerprint images). For example, the best fingerprint image is a fingerprint image having the beset clarity. The terminal acquires at least one (such as K, where K is an integer greater than 1) underlying data used to generate the second target fingerprint image. The terminal determines whether the finger of the user is the wet finger based on the number of underlying data in a default range of the K underlying data. As an implementation, among the K underlying data, when the number of underlying data in the default range is greater than or equal to a first threshold, the terminal determines that the finger of the user is the wet finger. On the other hand, when the number of the underlying data in the default range is less than the first threshold, the terminal determines that the finger of the user is not the wet finger.

For example, fingerprint includes finger valleys and finger ridges, when the finger of the user is the wet finger, finger valleys are filled with water drop on the finger of the user. In this case, when the fingerprint recognition sensor is pressed by the finger of the user, the majority of the underlying data acquired by sensing electrodes of the fingerprint recognition sensor are in or beyond the range of the finger ridge. Therefore, the terminal may determine whether the finger of the user is the wet finger through determining how much underlying data acquired by the sensing electrodes of the fingerprint recognition sensor are in the range of finger valley, which may be implemented as follows. The terminal first selects the second target fingerprint image from the M first fingerprint images, and then acquires the K underlying data used to generate the second target fingerprint image. When the number of underlying data in the default range of the K underlying data is greater than or equal to the first threshold (that is, the default range is the range of finger valley, for example, the default range may be 0-40, the first threshold may be 30, 40, 50, or other values), the terminal determines that the finger of the user is the wet finger. Otherwise, the terminal determines that the finger of the user is not the wet finger.

Manner 2

The terminal determines a third target fingerprint image, and the third target fingerprint image is the best fingerprint image of the at least one first fingerprint image such as the M first fingerprint images. For example, the best fingerprint image is a fingerprint image having the beset clarity. The terminal extracts feature points of the third target fingerprint image. The terminal determines whether the finger is the wet finger based on the number of the feature points of the third target fingerprint image. As one implementation, when the number of the feature points of the third target fingerprint image is less than a second threshold, the terminal determines that the finger of the user is the wet finger. Otherwise, when the number of the feature points of the third target fingerprint image is greater than or equal to the second threshold, the terminal determines that the finger of the user is not the wet finger.

For example, when the finger of the user that presses the fingerprint recognition sensor is a wet finger, prints of the received or collected fingerprint image may be unclear because of the spray on the finger of the user, which results in that feature points that can be extracted in the fingerprint image are small. Consequently, the terminal may determine whether the finger of the user is the wet finger through determining the number of feature points that can be acquired in the fingerprint image, which may be implemented as follow. The terminal first selects a third target fingerprint image from the at least one first fingerprint images, and then extracts feature points of the third target fingerprint image. When the number of the feature points of the third target fingerprint image is less than a second threshold (such as, 50, 60, 70, or other values), the terminal determines that the finger of the user is the wet finger. Otherwise, the terminal determines that the finger of the user is not the wet finger.

Steady State Determination

The manner in which the terminal determines whether the finger of the user is in the steady state based on the at least one first fingerprint image may be implemented as follows.

Take M first fingerprint images as an example. The terminal determines the clarity of each of the M first fingerprint images and determines the difference in the clarity of any two of the M first fingerprint images. When the difference in the clarity of any two of the M first fingerprint images is less than or equal to a default threshold, the terminal determines that the finger of the user is in the steady state. When the difference in the clarity of any two of the M first fingerprint images is greater than the default threshold, the terminal determines that the finger of the user is not in the steady state.

For example, generally, when the finger of the user is in the steady state, the clarity of fingerprint images received at different time points by the fingerprint recognition sensor is close. Therefore, the terminal can receive multiple first fingerprint images and then determine the difference in the clarity of any two first fingerprint images. When the difference in the clarity of any two first fingerprint images is less than or equal to the default threshold (for example, the difference may be less than 3%, 5%, or other values), the terminal can determine that the finger of the user is in the steady state. Otherwise, the terminal can determine that the finger of the user is not in the steady state.

As an implementation, at block 108, the manner in which the matching process is performed on the first target fingerprint image may be implemented as follows.

The terminal extracts overall features of the first target fingerprint image, and compares the extracted overall features of the first target fingerprint image with overall features of a pre-stored fingerprint template of the terminal. Based on a similarity (or can be referred to as a first similarity) between the overall features of the first target fingerprint image and the overall features of the pre-stored fingerprint template, the terminal extracts local features of the first target fingerprint image, and compares the local features of the first target fingerprint image with local features of the fingerprint template. The terminal determines that the first target fingerprint image is matched based on a similarity (or can be referred to as a second similarity) between the local features of the first target fingerprint image and the local features of the fingerprint template.

For example, the terminal extracts the local features when the first similarity is greater than or equal to a third threshold; the terminal determines that the first target fingerprint image is matched when the second similarity is greater than or equal to a fourth threshold, that is, the matching/comparison process is successful.

For example, in order to further reduce the power consumption of the terminal, the terminal may first extract the overall features of the first target fingerprint image (without extracting the local features) during fingerprint comparison.

When the overall features match with the overall features of the fingerprint template (that is, the first similarity between the two is greater than or equal to the third threshold, for example, the third threshold can be 70%, 80%, 85%, 90% or other values), the terminal extracts the local features of the first target fingerprint image and conduct local features comparison. When the overall features are not matched with the overall features of the fingerprint template, the terminal can directly determine that the fingerprint comparison is not matched.

When the local features of the first target fingerprint image match with the local features of the fingerprint template (that is, the second similarity between the two is greater than or equal to the fourth threshold, for example, the fourth threshold can be 70%, 80%, 85%, 90% or other values), the terminal determines that the fingerprint comparison is successful. It can be seen that, during the fingerprint comparison, the overall features are extracted first, and the local features are extracted for comparison when the overall features are matched; in this way, it is possible to avoid the problem that the fingerprint comparison is performed when the inputted fingerprint image is not the fingerprint image of the user himself, thereby avoid increasing the power consumption of the terminal.

For implementation of the operation at block 110, the terminal can be unlocked as follows. For example, the terminal acquires and displays service information associated with the current location of the terminal.

For example, when the current location of the terminal is a restaurant (belongs to default service types), the terminal may acquire service information associated with the restaurant and the service information may be special orders, menu, and so on. Then the terminal may display the acquired service information on the display of the terminal for viewing of users.

Figure 2A:
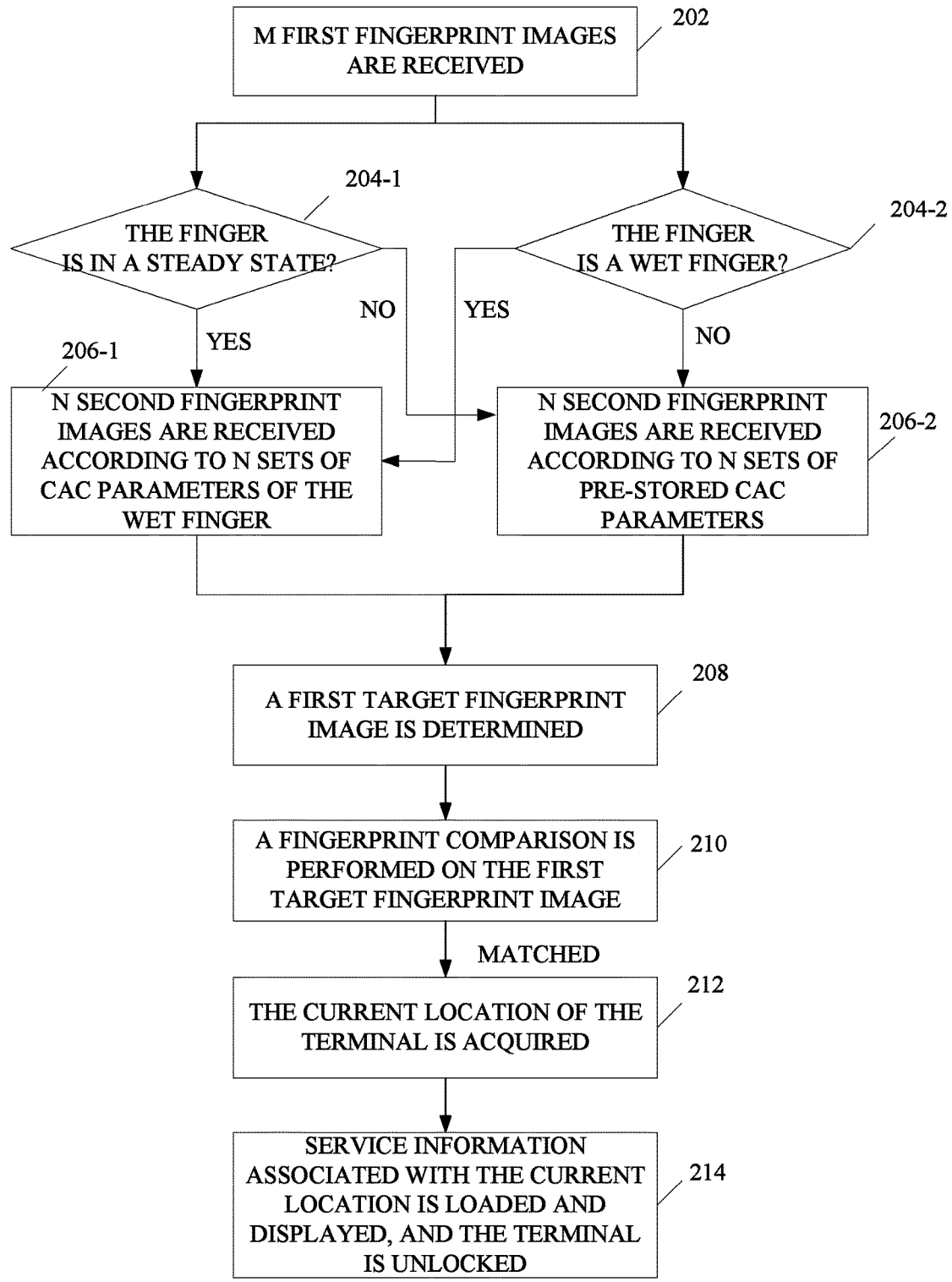
FIG. 2A is a flow schematic diagram illustrating another method for controlling unlocking according to an implementation of the present disclosure.

According to another aspect of the present disclosure, a more detailed method for controlling unlocking is provided. As illustrated in FIG. 2A, the method may begin at block 202.

At block 202, a terminal receives M first fingerprint images when a touch operation of a finger of a user on a fingerprint recognition sensor is detected, where M is a positive integer.

At block 204-1, the terminal determines whether the finger of the user is in a steady state based on the M first fingerprint images. When the finger of the use is in the steady state, proceed to block 208; otherwise, proceed to block 208 or block 210 after a predetermined time period. The predetermined time period may be predetermined by the terminal, or may be set by the user subsequently. The present disclosure is not limited thereto.

At block 204-2, the terminal determines whether the finger of the user is a wet finger based on the M first fingerprint images. When the finger of the user is the wet finger, proceed to block 206-1, otherwise, proceed to block 206-2.

For example, when the finger is in the steady state and the finger is the wet finger, proceed to block 206-1; when the finger is in the steady state and the finger is not the wet finger, proceed to block 206-2; when the finger is not in the steady state and the finger is the wet finger, proceed to block 206-1 after the predetermined time period; when the finger is not in the steady state and the finger is not the wet finger, proceed to block 206-2 after the predetermined time period.

At block 206-1, the terminal determines N sets of CAC parameters corresponding to the wet finger and receives N second fingerprint images based on the N sets of CAC parameters corresponding to the wet finger.

At block 206-2, the terminal determines pre-stored N sets of CAC parameters and receives N second fingerprint images based on the pre-stored N sets of CAC parameters.

At block 208, the terminal determines a first target fingerprint image; the first target fingerprint image is a fingerprint image with the best image quality of the N second fingerprint images.

At block 210, the terminal executes a fingerprint comparison process on the first target fingerprint image. When the result of the fingerprint comparison process is matched, proceed to block 212.

At block 212, the terminal acquires the current location of the terminal.

At block 214, when the current location of the terminal belongs to a default type, the terminal acquires and displays service information associated with the current location.

It is to be noted that, the operation at block 204-2 can be performed in parallel with the operation at block 204-1. The operation that when the finger of the use is not in the steady state is not illustrated in FIG. 2, it does mean that the operation is not executed or is invalid. Besides, details of the implementation of operations from block 202 to block 214 may refer to the method described above.

Figure 2B:
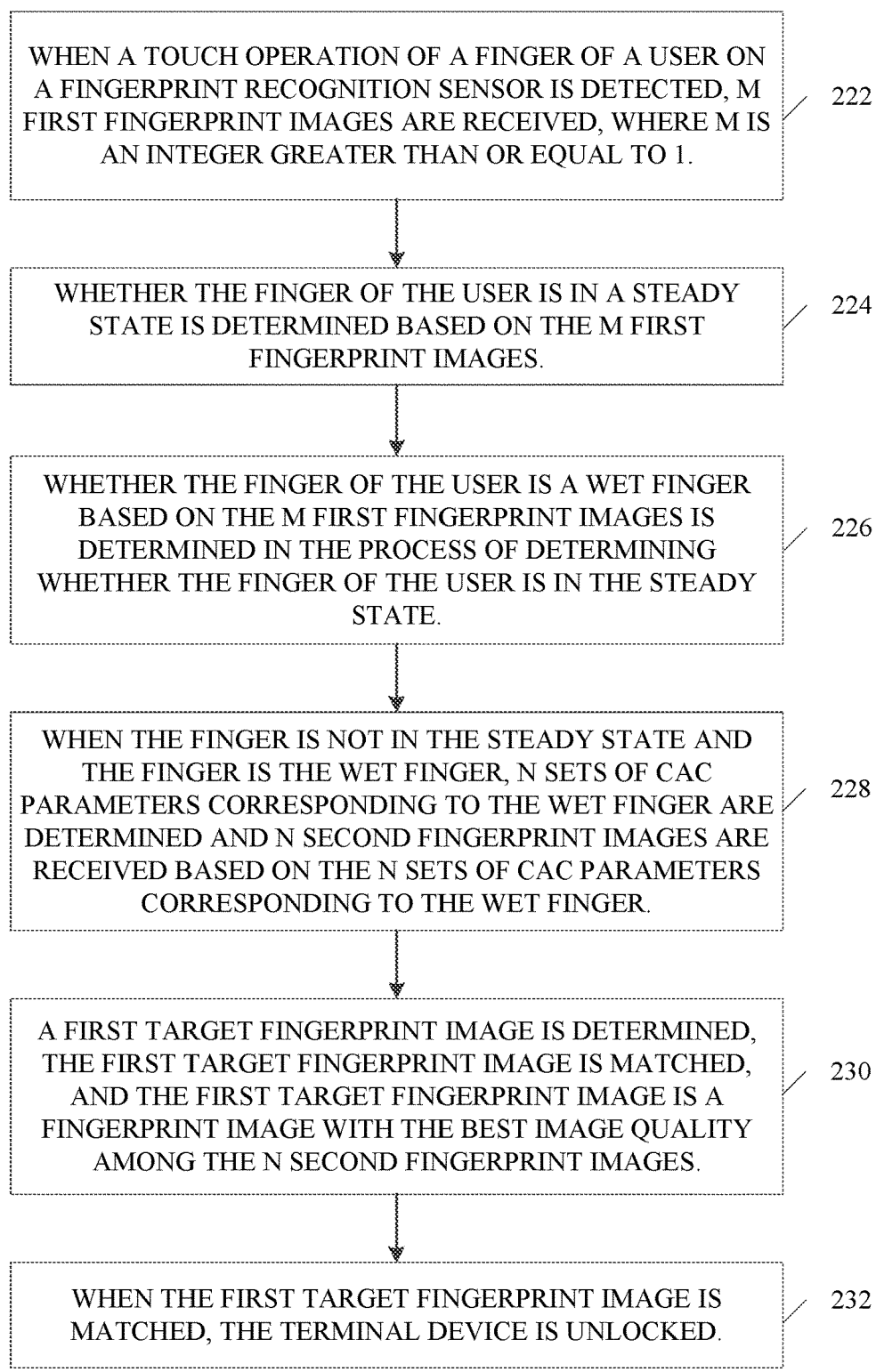
FIG. 2B is a flow schematic diagram illustrating still another method for controlling unlocking according to an implementation of the present disclosure.

According to still another aspect of the present disclosure, a method for controlling unlocking is provided. As illustrated in FIG. 2B, the method may begin at block 222.

At block 222, when a touch operation of a finger of a user on a fingerprint recognition sensor is detected, M first fingerprint images are received, where M is an integer greater than or equal to 1.

At block 224, whether the finger of the user is in a steady state is determined based on the M first fingerprint images.

At block 226, whether the finger of the user is a wet finger based on the M first fingerprint images is determined in the process of determining whether the finger of the user is in the steady state.

In one implementation, determining whether the finger of the user is a wet finger based on the M first fingerprint images may include the follows. A second target fingerprint image is determined, and the second target fingerprint image is a fingerprint image having the best clarity among the M first fingerprint images. K underlying data configured to generate the second target fingerprint image are acquired, where K is an integer greater than 1. When the number of underlying data in a default range among the K underlying data is greater than or equal to a first threshold, determine that the finger is the wet finger. When the number of the underlying data in the default range among the K underlying data is less than the first threshold, determine that the finger is not the wet finger.

In another implementation, determining whether the finger of the user is a wet finger based on the M first fingerprint images may include the follows. A third target fingerprint image is determined, and the third target fingerprint image is a fingerprint image having the best clarity among the M first fingerprint images. Feature points of the third target fingerprint image are extracted. When the number of the feature points of the third target fingerprint image is less than a second threshold, determine that the finger is the wet finger. When the number of the feature points of the third target fingerprint image is greater than or equal to the second threshold, determine that the finger is not the wet finger.

At block 228, when the finger is not in the steady state and the finger is the wet finger, N sets of CAC parameters corresponding to the wet finger are determined and N second fingerprint images are received based on the N sets of CAC parameters corresponding to the wet finger.

At block 230, a first target fingerprint image is determined, the first target fingerprint image is matched, and the first target fingerprint image is a fingerprint image with the best image quality among the N second fingerprint images.

At block 232, when the first target fingerprint image is matched, the terminal device is unlocked.

Figure 3:
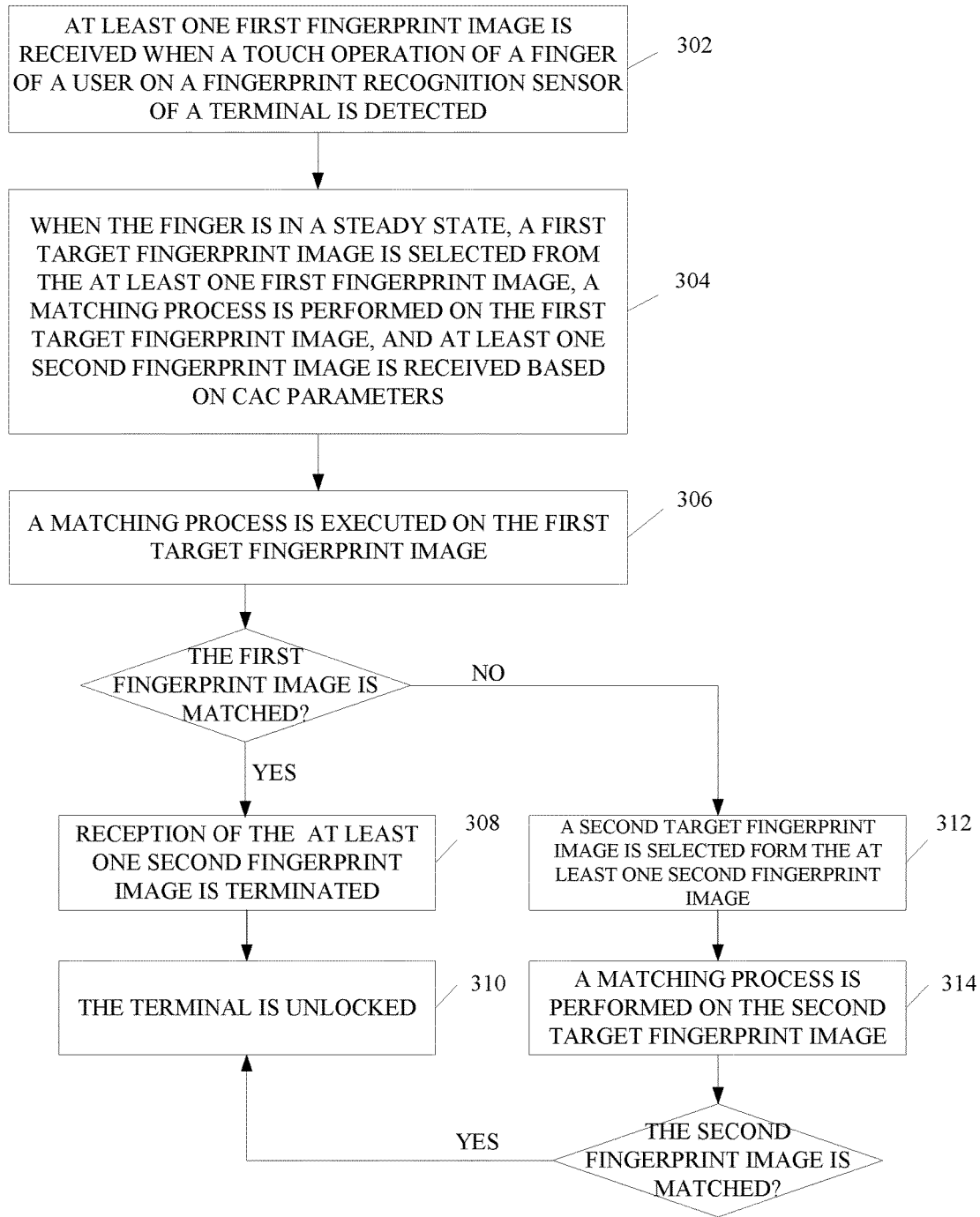
FIG. 3 is a flow schematic diagram illustrating yet another method for controlling unlocking according to an implementation of the present disclosure.

According to yet another aspect of the present disclosure, there is provided another method for controlling unlocking. In the method described above, fingerprint comparison is executed after receiving the first fingerprint images and the second fingerprint images. The present disclosure is not limited thereto. For example, in order to further save unlocking time of the terminal, fingerprint comparison can be performed while the second fingerprint images are received. FIG. 3 illustrates the method in detail. As illustrated in FIG. 3, the method can begin at block 302.

At block 302, at least one first fingerprint image is received when a touch operation of a finger of a user on a fingerprint recognition sensor of a terminal is detected.

At block 304, when the finger is in a steady state, a first target fingerprint image is selected from the at least one first fingerprint image, a matching process is performed on the first target fingerprint image, and at least one second fingerprint image is received based on CAC parameters; the first target fingerprint image is the best fingerprint image of the at least one first fingerprint image, such as a fingerprint image having the best clarity. As can be seen, fingerprint comparison on the first fingerprint image and reception of the at least one second fingerprint image can be conducted in parallel.

At block 306, a matching process is executed on the first target fingerprint image.

At block 308, when the first target fingerprint image is matched, the reception of the at least one second fingerprint image is terminated and at block 310, the terminal is unlocked. As can be seen, since there is no need to receive all second fingerprint images, time required for unlocking can be further saved.

On the other hand, when the first target fingerprint image is not matched, at block 312, a second target fingerprint image is selected form the at least one second fingerprint image.

At block 314, a matching process is performed on the second target fingerprint image; when the second target fingerprint image is matched, proceed to block 310 to unlock the terminal.

Similarly, as the forgoing methods, before the at least one second fingerprint image is received, it can be determined that whether the finger of the user is in the steady state and whether the finger of the user is a wet finger based on the at least one first fingerprint image.

When the finger of the user is the wet finger, the at least one second fingerprint image can be received based on the CAC parameters as follows: CAC parameters corresponding to the wet finger is determined; and the at least one second fingerprint image is received based the determined CAC parameters corresponding to the wet finger.

The manner in which whether the finger of the user is the wet finger is determined includes but not limited to: (1) at least one underlying data used to generate the first target fingerprint image is acquired; and it is determined whether the finger is the wet finger based on the number of underlying data in a default range of the at least one underlying data; or (2) feature points of the first target fingerprint image are extracted; and it is determined that whether the finger is the wet finger based on the number of the feature points of the second target fingerprint image.

For details not illustrated herein, please refer to the description of FIG. 1 and FIG. 2A-FIG. 2B, and will not be repeated here.

Figure 4:
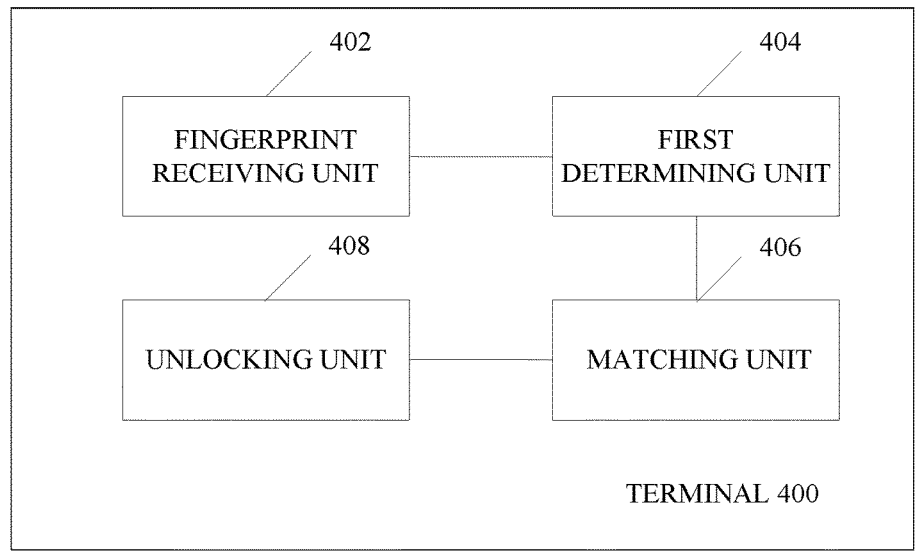
FIG. 4 is a structure schematic diagram illustrating a terminal according to an implementation of the present disclosure.

According to an implementation of the present disclosure, there is provided a terminal. FIG. 4 is a structure schematic diagram illustrating the terminal. As illustrated in FIG. 4, a terminal 400 includes a fingerprint receiving unit 402, a first determining unit 404, a matching unit 406, and an unlocking unit 408.

The fingerprint receiving unit 402 is configured to receive at least one (such as M, where M is a positive integer) first fingerprint image when a touch operation of a finger of a user on a fingerprint recognition sensor of a terminal is detected, and receive at least one (such as N, where N is a positive integer, and in at least one implementation, N is an integer greater than 1) second fingerprint image based on CAC parameters when the finger is in a steady state.

The first determining unit 404 is configured to determine a first target fingerprint image. The first target fingerprint image is the best fingerprint image of the at least one second fingerprint image, for example, the first target fingerprint image is a finger print image having the best clarity.

The matching unit 406 is configured to match the first target fingerprint image.

The unlocking unit 408 is configured to unlock the terminal when the first target fingerprint image is matched.

Figure 5:
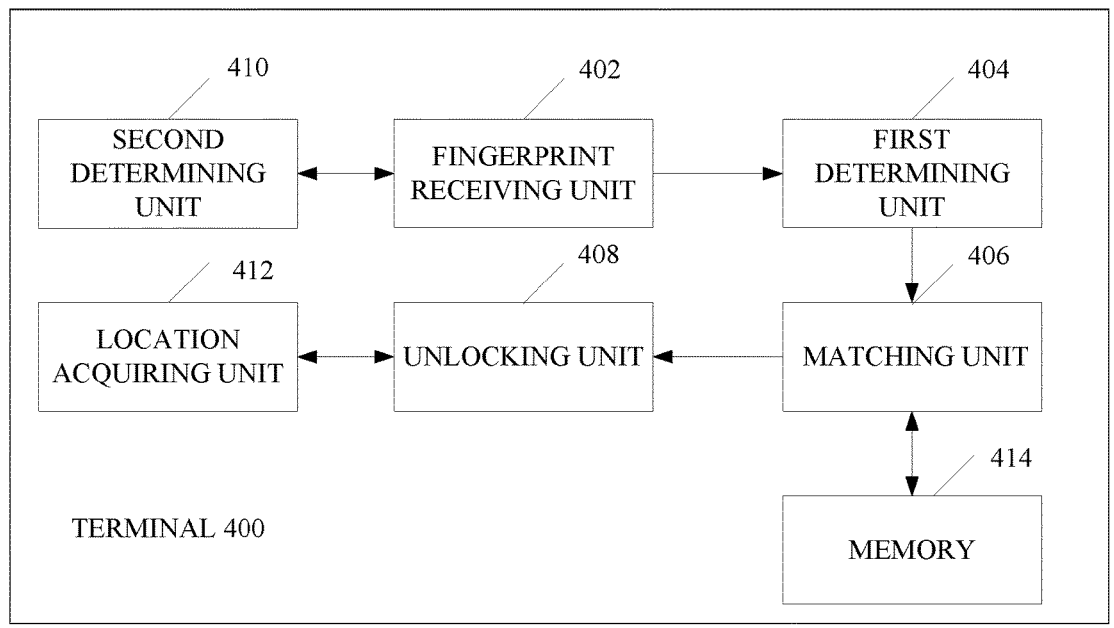
FIG. 5 is another structure schematic diagram illustrating the terminal according to an implementation of the present disclosure.

As illustrated in FIG. 5, the terminal 400 may further includes a second determining unit 410. The second determining unit 410 is configured to determine, based on the at least one first fingerprint image received by the fingerprint receiving unit 402, whether the finger of the user is in the steady state and whether the finger of the user is a wet finger. Correspondingly, when the second determining unit 410 determines that the finger of the user is the wet finger, the fingerprint receiving unit 402 is configured to determine CAC parameters corresponding to the wet finger, and receive the at least one second fingerprint image based on the determined CAC parameters corresponding to the wet finger. The number of the CAC parameter corresponding to the number of the second fingerprint image. For example, N sets CAC parameters are determined so as to receive N second fingerprint images.

The second determining unit 410 is configured to determine a second target fingerprint image, the second target fingerprint image is the best fingerprint image (such as a fingerprint image with the best clarity) of the at least one first fingerprint image; acquire at least one (such as K, where K is an integer greater than 1) underlying data used to generate the second target fingerprint image; determine whether the finger of the user is the wet finger based on the number of underlying data in a default range of the at least one underlying data. For example, when the number of underlying data in the default range of the K underlying data is greater than or equal to a first threshold, the second determining unit 410 determines that the finger of the user is the wet finger; and when the number of the underlying data in the default range of the K underlying data is less than the first threshold, the second determining unit 410 determines that the finger of the user is not the wet finger.

Alternatively, the second determining unit 410 is configured to determine a third target fingerprint image, which is a fingerprint image with the best clarity of the at least one first fingerprint images; extract feature points of the third target fingerprint image; determine that the finger of the user is the wet finger based on the number of the feature points of the third target fingerprint image. For example, the second determining unit 410 may determine that the finger of the user is the wet finger when the number of the feature points of the third target fingerprint image is less than a second threshold; and determine that the finger of the user is not the wet finger when the number of the feature points of the third target fingerprint image is greater than or equal to the second threshold.

The matching unit 406 is further configured to: extract overall features of the first target fingerprint image, and compare the extracted overall features of the first target fingerprint image with overall features of a pre-stored fingerprint template of the terminal, such as a fingerprint template stored in a memory 414 of the terminal; extract local features of the first target fingerprint image, and compare the local features of the first target fingerprint image with local features of the fingerprint template, based on a first similarity between the overall features of the first target fingerprint image and the overall features of the fingerprint template; determine that the first target fingerprint image is matched based on a second similarity between the local features of the first target fingerprint image and the local features of the fingerprint template. For example, when the first similarity is greater than or equal to a third threshold, the matching unit 406 extracts the local features; and when the second similarity is greater than or equal to a fourth threshold, the matching unit 406 determines that the first target fingerprint image is matched.

Alternatively, the terminal further may further include a location acquiring unit 412. The location acquiring unit 412 is configured to acquire the current location of the terminal. The unlocking unit 408 is further configured to acquire and display service information associated with the current location of the terminal upon unlocking the terminal.

It should be noted that, the components described above, that is, the fingerprint receiving unit 402, the first determining unit 404, the matching unit 406, the unlocking unit 408, the second determining unit 410, and the location acquiring unit 412 may be configured to implement corresponding operations above.

In this implementation, the terminal 400 is presented in the form of units or modules. "Units/Modules" used herein may refer to any one of an application-specific integrated circuit (ASIC), processors for performing one or more software or hardware programs, a memory, an integrated logic circuit, or other components with the above functions.

Figure 6:
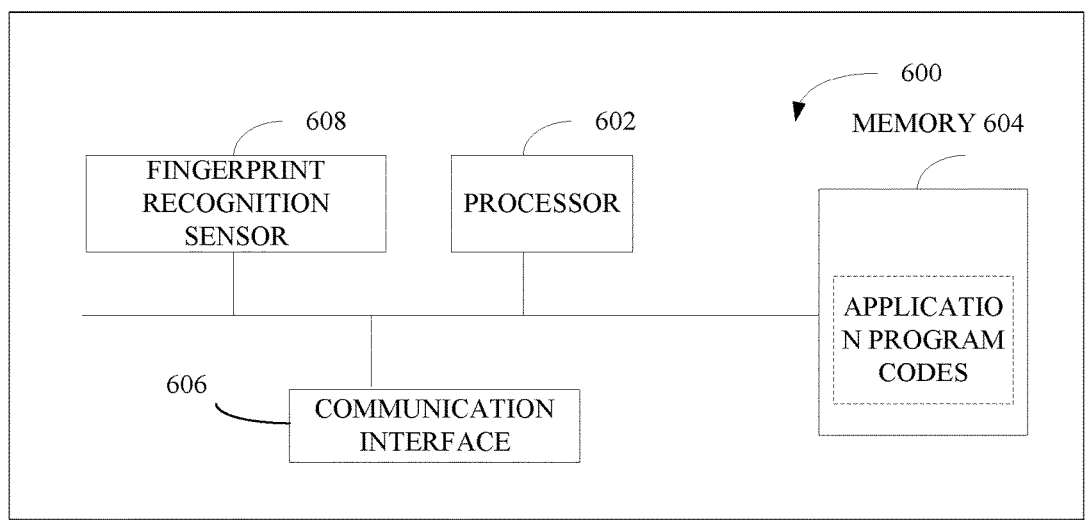
FIG. 6 is another structure schematic diagram illustrating a terminal according to an implementation of the present disclosure.

As illustrated in FIG. 6, a terminal 600 may be implemented in the structure of FIG. 4, and the terminal 600 may include at least one processor 602, at least one memory 604, at least one communication interface 606, and a fingerprint recognition sensor 608. The processor 602, the memory 604, the fingerprint recognition sensor 608, and the communication interface 606 can be connected and communicated with each other via a communication bus. Besides, the fingerprint receiving unit 402 may be implemented via the fingerprint recognition sensor 608 of the terminal illustrated in FIG. 6, the first determining unit 404, the matching unit 406, the unlocking unit 408, the second determining unit 410, and the location acquiring unit 412 may be implemented via the processor 602 of the terminal illustrated in FIG. 6.

The processor 602 may be one of a central processing unit (CPU), a micro-processor, an application-specific integrated circuit (ASIC), or one or more integrated circuits for controlling the programs for the implementation of above-mentioned technical solutions.

The communication interface 606 is configured to communicate with other devices or communication networks such as Ethernet, radio access network (RAN), wireless local area network (WLAN) and the like.

The memory 604 may be a read-only memory (ROM) or other types of static storage devices that can store static information and instructions, random access memory (RAM) or other types of dynamic storage devices that can store information and instructions, or may be electrically erasable programmable read-only memory (EEPROM), compact disc read-only memory (CD-ROM) or other disc storage media, disc storage media (including compact discs, laser discs, compact discs, digital versatile discs, Blue-ray discs and the like), disk storage media or other magnetic storage devices, or may be any other media that can be used to carry or store desired program code in the form of instructions or data structures and that can be accessed by a computer. The present disclosure is not limited thereto. The memory 604 can exist independently and connect to the processor 602 via the communication interface 606. The memory 604 can also be integrated with the processor 602.

The memory 604 is configured to store application codes that executes the above-mentioned technical schemes and is controlled by the processor 602. The processor 602 is configured to execute the application codes stored in the memory 604.

The programs codes stored in the memory 604 can be used to perform the method for controlling unlocking of a terminal as illustrated in FIG. 1 to FIG. 2A-FIG. 2B. For example, when a touch operation of the finger of the user on a fingerprint recognition sensor of a terminal is detected, M first fingerprint images are received, where M is a positive integer; when the finger of the user is in the steady state, N second fingerprint images are received based on N sets of CAC parameters, where N is an integer greater than 1; a first target fingerprint image is determined, a fingerprint comparing process is executed on the first target fingerprint image, the first target fingerprint image is the best fingerprint image of the N second target fingerprint images; when the first target fingerprint image is matched, the terminal is unlocked.

Figure 7:
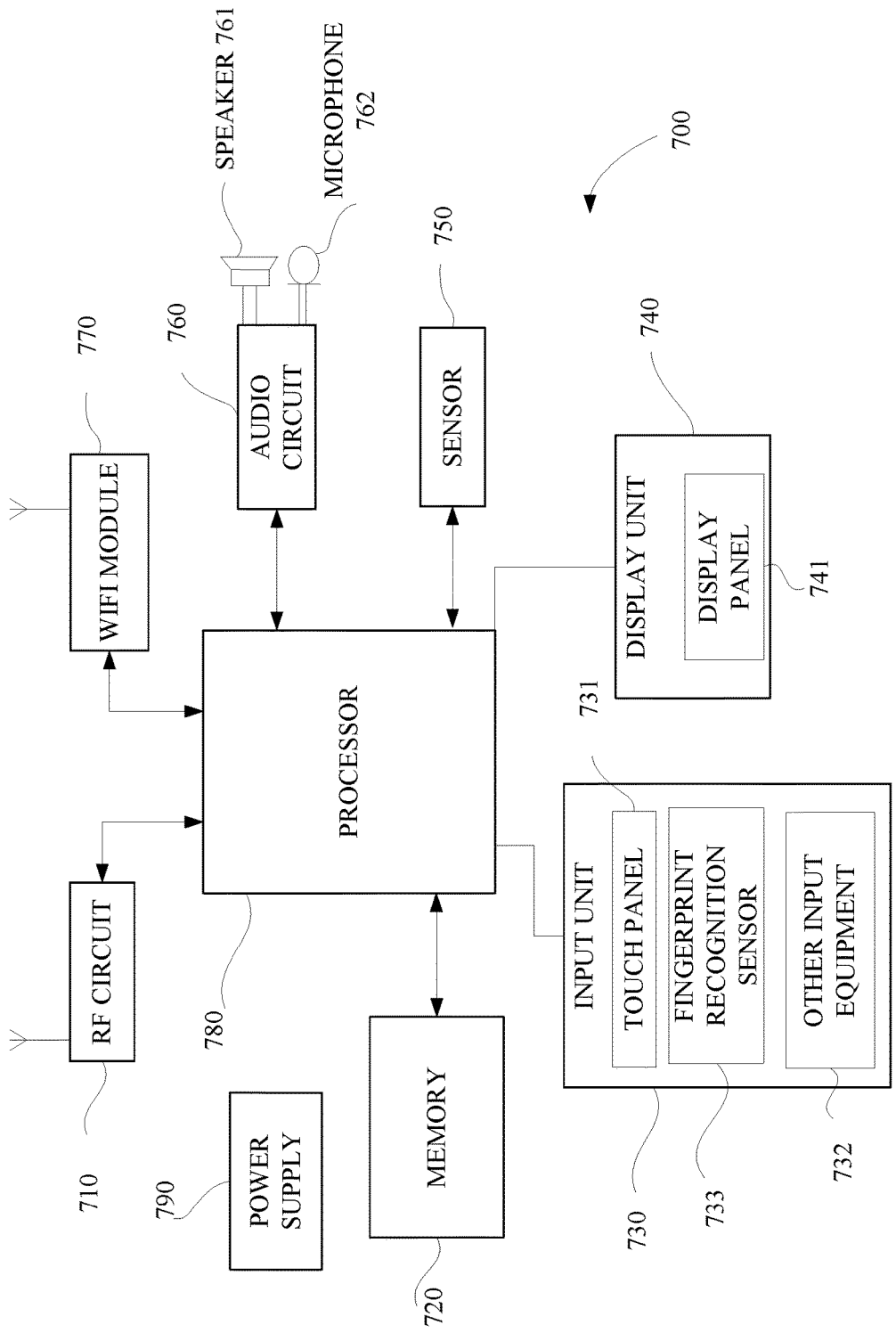
FIG. 7 is another structure schematic diagram illustrating a terminal according to an implementation of the present disclosure.

The implementation of the present disclosure further provides a more specific application scenario in which the terminal is a mobile phone and the following describes components of the mobile phone in detail with refer to FIG. 7. As illustrated in FIG. 7, a mobile phone 700 can includes a RF (radio frequency) circuit 710, a memory 720, an input unit 730, a display unit 740, a sensor 750, an audio circuit 760, a Wi-Fi module 770, a processor 780, and a power supply 790. The input unit 730 further includes a touch panel 731, other input devices 732, and a fingerprint recognition sensor 733. The display unit 740 includes a display panel 741. The audio circuit 760 is connected with a speaker 761 and a microphone 762.

The RF circuit 710 is configured for receiving and transmitting signals or transmitting or receiving information during a call, and in particular, receiving downlink information of a base station and transferring the downlink information to the processor 780 for processing, and transmitting uplink data to the base station. Generally, the RF circuit 710 includes but not limited to an antenna, at least one amplifier, a transceiver, coupler, low noise amplifier (LNA), duplexer and the like. In addition, the RF circuit 710 may also communicate with the network and other devices by wireless communication. The above wireless communication may use any communication standard or protocol, which includes but not limited to Global System of mobile communication (GSM), general packet radio service (GPRS), code division multiple access (CDMA), wideband code division multiple access (WCDMA), long term evolution (LTE), E-mail, short messaging service (SMS) and so on.

The memory 720 may be configured to store software programs and modules, and the processor 780 executes various function applications and data processing of the mobile phone by running the software programs and the modules stored in the memory 720. The memory 720 may mainly include a program storage region and a data storage region, the storage program region may store an operation system, application programs needed for at least one function (a fingerprint image acquisition function, a fingerprint matching function, and an unlocking function) and so on; and the data storage region may store data (such as fingerprint data received by a fingerprint recognition sensor, underlying data for storing a fingerprint image received) created according to use of the mobile phone, and so on. In addition, the memory 720 may include a high-speed RAM, and may further include a non-volatile memory such as one of at least a disk storage device, a flash device, or other non-volatile solid storage devices.

The input unit 730 may be configured to receive input digital or character information and generate key signal input associated with user setting and functional control of the mobile phone. Specifically, the input unit 730 may include a touch panel 731, other input devices 732 and a fingerprint recognition sensor 733. The touch panel 731, also referred to as a touch screen, may receive a touch operation of the user thereon or nearby (e.g., operation on or near the touch panel 731 by a user using a finger or stylus, or any suitable object or attachment), and drive a corresponding connection device according to a pre-set program. The touch panel 731 may include a touch detection device and a touch controller. The touch detection device detects the touching position of the user and detects a signal resulted from the touch operation, and transmits the signal to the touch controller. The touch controller receives the touch information from the touch detection device and converts the information into contact coordinates and sends it to the processor 780, the touch controller can receive and execute the command sent by the processor 780. In addition, the touch panel 731 can be realized using various types such as resistive, capacitive, infrared, and surface acoustic waves. In addition to the touch panel 731, the input unit 730 may still include other input devices 732. The other input devices 732 may include, but is not limited to, at least one of a physical keyboard, a function key (such as volume control buttons, switch buttons and so on), a trackball, a mouse, and a joystick. The fingerprint recognition sensor 733 may be provided in conjunction with the dome key of the terminal or can be provided in combination with the touch panel 731. For example, the fingerprint recognition sensor 733 is provided below the touch panel 731, when a finger of the user touches the touch panel of the terminal, the fingerprint recognition sensor 733 below the touch panel 731 can receive a fingerprint image of the finger of the user.

The display unit 740 may be configured to display information input by the user or information provided for the user or various menus of the mobile phone. The display unit 740 may include a display panel 741, and alternatively, the display panel 741 may be configured in the form of a liquid crystal display (LCD), an organic light-emitting diode (OLED) and so on. Further, the touch panel 731 may cover the display panel 741. When the touch panel 731 detects a touch operation (touch event) thereon or nearby, information of the touch operation can be transmitted to the processor 780 so as to determine the type of the touch event. The processor 780 provides corresponding visual output on the display panel 741 according to the type of the touch event. Although in FIG. 7, the touch panel 731 and the display panel 741 are used as two separate components to realize the input and output functions of the mobile phone, in some implementations, the touch panel 731 may be integrated with the display panel 741 to implement the input and output functions of the mobile phone.

The mobile phone may also include at least one sensor 750, such as a light sensor, a motion sensor, and other sensors. Specifically, the light sensor may include an ambient light sensor and a proximity sensor, among which the ambient light sensor may adjust the brightness of the display panel 741 according to ambient lights, and the proximity sensor may turn off the display panel 741 and/or backlight when the mobile phone reaches nearby the ear. As a kind of motion sensor, the accelerometer sensor can detect the magnitude of acceleration in all directions (typically three axes, that is, x, y, and z); when stationary, the accelerometer sensor can detect the magnitude and direction of gravity when stationary; the accelerometer sensor can also identify the application of mobile gestures (such as vertical and horizontal screen switch, related games, magnetometer attitude calibration), or the accelerometer sensor can be used for vibration recognition of related functions (such as a pedometer, percussion) and so on. The mobile phone can also be equipped with a gyroscope, barometer, hygrometer, thermometer, infrared sensor and other sensors, and will not repeat here.

The audio circuit 760, the speaker 761, the microphone 762 may provide an audio interface between the user and the mobile terminal. The audio circuit 760 may convert the received audio data into electrical data and transfer the electrical data to the speaker 761; thereafter the speaker 761 converts the electrical data into a sound signal for output. On the other hand, the microphone 762 converts the received sound signal into an electrical signal which will be received by the audio circuit 760 and converted into audio data to output to the processor 780, the audio data is processed by the output processor 780 and transmitted via an RF circuit 710 to, for example, another mobile phone, or, the audio data is output to the memory 720 for further processing.

Wi-Fi belongs to a short-range wireless transmission technology, the mobile phone may assist the user in E-mail receiving and sending, webpage browsing, access to streaming media and the like by means of the Wi-Fi module 770; Wi-Fi provides users with wireless broadband Internet access. Although illustrated in FIG. 7, it should be understood that the Wi-Fi module 770 is not a necessary part of the mobile phone and can be omitted according to actual needs without departing from the essential nature of the present disclosure.

The processor 780 is the control center of the mobile phone, it uses various interfaces and lines to connect various parts of the whole mobile phone, runs or executes software programs and/or modules stored in the memory 720, and calls data stored in the memory 720 to perform various functions of the mobile phone and process data, thereby monitoring the mobile phone. In at least one implementation, the processor 780 may include one or more processing units; for example, the processor 780 may integrate an application processor and a modem processor, wherein the application processor handles the operating system, the user interface, the application, and so on, and the modem processor mainly processes wireless communication. It will be appreciated that the above-mentioned modem processor may not be integrated into the processor 780.

The mobile phone also includes a power supply 790 (e.g., a battery) that supplies power to various components. For instance, the power supply 790 may be logically connected to the processor 780 via a power management system to enable management of charging, discharging, and power consumption through the power management system. Although not illustrated, the mobile phone may include a camera, a Bluetooth module, etc., and will not be elaborated here. The method of each step in the foregoing implementations can be realized based on the configuration of the terminal illustrated in FIG. 7.

The implementation of the present disclosure also provides a computer readable storage medium. The computer readable storage medium may store a program which, when executed, can accomplish all or part of the steps of the unlocking method described in the above-described method implementation.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps may be performed in other order or simultaneously. Also, it will be appreciated by those skilled in the art that the implementations described in the specification are exemplary implementations and the actions and modules involved are not necessarily necessary for the present disclosure.

In the foregoing implementations, descriptions of each implementation are emphasized respectively, and parts which are not elaborated in a certain implementation may subject to relevant descriptions of other implementations.

The apparatus disclosed in implementations provided herein may be implemented in other ways. For example, the device/apparatus implementations described above are merely illustrative; for instance, the division of the unit is only a logical function division and there can be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components shown as units may or may not be physical units, and namely they may be in the same place or may be distributed to multiple network elements. Part or all of the units may be selected per actual needs to achieve the purpose of the technical solutions of the implementations.

In addition, the functional units in various implementations of the present disclosure may be integrated in one processing unit, or each unit may be physically present, or two or more units may be integrated in one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory described above includes a variety of media that can store programs codes, such as a USB disk, a read-only memory (ROM), a random-access memory (RAM), a mobile hard disk, a magnetic disk, or an optical disk and so on.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or CD, and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for controlling unlocking, comprising:
receiving M first fingerprint images when a touch operation of a finger of a user on a fingerprint recognition module of a terminal device is detected, wherein M is an integer greater than or equal to 1;
determining whether the finger of the user is in a steady state based on the M first fingerprint images;
determining whether the finger of the user is a wet finger based on the M first fingerprint images in the process of determining whether the finger of the user is in the steady state;
determining N sets of capacity auto control (CAC) parameters corresponding to the wet finger, and receiving N second fingerprint images based on the N sets of CAC parameters corresponding to the wet finger, when the finger of the user is in the steady state and the finger of the user is the wet finger, wherein N is an integer greater than 1;
determining a first target fingerprint image, and matching the first target fingerprint image, wherein the first target fingerprint image is a fingerprint image with the best image quality among the N second fingerprint images; and
unlocking the terminal device when the first target fingerprint image is matched;
wherein the determining whether the finger of the user is a wet finger based on the M first fingerprint images comprises:
determining a second target fingerprint image, wherein the second target fingerprint image is a fingerprint image having the best clarity among the M first fingerprint images;
acquiring K underlying data configured to generate the second target fingerprint image, wherein K is an integer greater than 1;
determining that the finger is the wet finger, when a number of underlying data in a default range among the K underlying data is greater than or equal to a first threshold; and
determining that the finger is not the wet finger, when the number of the underlying data in the default range among the K underlying data is less than the first threshold; or
wherein the determining whether the finger of the user is a wet finger based on the M first fingerprint images comprises:
determining a third target fingerprint image, wherein the third target fingerprint image is a fingerprint image having the best clarity among the M first fingerprint images;
extracting feature points of the third target fingerprint image;
determining that the finger is the wet finger, when the number of the feature points of the third target fingerprint image is less than a second threshold; and
determining that the finger is not the wet finger, when the number of the feature points of the third target fingerprint image is greater than or equal to the second threshold.

2. The method of claim 1, wherein the matching the first target fingerprint image comprises:
extracting overall features of the first target fingerprint image, and comparing the overall features of the first target fingerprint image with overall features of a pre-stored fingerprint template of the terminal device;

extracting local features of the first target fingerprint image and comparing the local features of the first target fingerprint image with local features of the pre-stored fingerprint template, when a similarity between the overall features of the first target fingerprint image and the overall features of the pre-stored fingerprint template is greater than or equal to a third threshold; and determining that the first target fingerprint image is matched, when a similarity between the local features of the first target fingerprint image and the local features of the pre-stored fingerprint template is greater than or equal to a fourth threshold.

3. The method of claim 1, further comprising:

acquiring a current location of the terminal device; and wherein when the current location of the terminal device belongs to a preset type, the unlocking the terminal device comprises:

acquiring and displaying service information associated with the current location of the terminal device.

4. The method of claim 2, further comprising:

acquiring a current location of the terminal device; and wherein when the current location of the terminal device belongs to a preset type, the unlocking the terminal device comprises:

acquiring and displaying service information associated with the current location of the terminal device.

5. A terminal device, comprising:

a memory, configured to store executable program codes;

a processor, coupled with the memory; and a fingerprint recognition module, configured to receive fingerprint images;

wherein the processor is configured to invoke the executable program codes stored in the memory to perform the following:

receiving M first fingerprint images when a touch operation of a finger of a user on a fingerprint recognition module of a terminal device is detected, wherein M is an integer greater than or equal to 1;

determining whether the finger of the user is in a steady state based on the M first fingerprint images;

determining whether the finger of the user is a wet finger based on the M first fingerprint images in the process of determining whether the finger of the user is in the steady state;

determining N sets of capacity auto control (CAC) parameters corresponding to the wet finger, and receiving N second fingerprint images based on the N sets of CAC parameters corresponding to the wet finger, when the finger of the user is in the steady state and the finger of the user is the wet finger, wherein N is an integer greater than 1;

determining a first target fingerprint image, and matching the first target fingerprint image, wherein the first target fingerprint image is a fingerprint image with the best image quality among the N second fingerprint images; and unlocking the terminal device when the first target fingerprint image is matched;

wherein the determining whether the finger of the user is a wet finger based on the M first fingerprint images comprises:

determining a second target fingerprint image, wherein the second target fingerprint image is a fingerprint image having the best clarity among the M first fingerprint images;

acquiring K underlying data configured to generate the second target fingerprint image, wherein K is an integer greater than 1;

determining that the finger is the wet finger, when a number of underlying data in a default range among the K underlying data is greater than or equal to a first threshold; and determining that the finger is not the wet finger, when the number of the underlying data in the default range among the K underlying data is less than the first threshold; or wherein the determining whether the finger of the user is a wet finger based on the M first fingerprint images comprises:

determining a third target fingerprint image, wherein the third target fingerprint image is a fingerprint image having the best clarity among the M first fingerprint images;

extracting feature points of the third target fingerprint image;

determining that the finger is the wet finger, when the number of the feature points of the third target fingerprint image is less than a second threshold; and determining that the finger is not the wet finger, when the number of the feature points of the third target fingerprint image is greater than or equal to the second threshold.

6. The terminal device of claim 5, wherein the matching the first target fingerprint image comprises:

extracting overall features of the first target fingerprint image, and comparing the overall features of the first target fingerprint image with overall features of a pre-stored fingerprint template of the terminal device;

extracting local features of the first target fingerprint image and comparing the local features of the first target fingerprint image with local features of the pre-stored fingerprint template, when a similarity between the overall features of the first target fingerprint image and the overall features of the pre-stored fingerprint template is greater than or equal to a third threshold; and determining that the first target fingerprint image is matched, when a similarity between the local features of the first target fingerprint image and the local features of the pre-stored fingerprint template is greater than or equal to a fourth threshold.

7. The terminal device of claim 5, wherein the processor is further configured to invoke the executable program codes stored in the memory to perform the following:

acquiring a current location of the terminal device; and wherein when the current location of the terminal device belongs to a preset type, the unlocking the terminal device comprises:

acquiring and displaying service information associated with the current location of the terminal device.

8. The terminal device of claim 6, wherein the processor is further configured to invoke the executable program codes stored in the memory to perform the following:

acquiring a current location of the terminal device; and wherein when the current location of the terminal device belongs to a preset type, the unlocking the terminal device comprises:

acquiring and displaying service information associated with the current location of the terminal device.

9. A non-transitory computer readable storage medium, being configured to store programs, which when executed by a processor, are operable with the processor to carry out actions comprising:
- receiving M first fingerprint images when a touch operation of a finger of a user on a fingerprint recognition module of a terminal device is detected, wherein M is an integer greater than or equal to 1;
- determining whether the finger of the user is in a steady state based on the M first fingerprint images;
- determining whether the finger of the user is a wet finger based on the M first fingerprint images in the process of determining whether the finger of the user is in the steady state;
- determining N sets of capacity auto control (CAC) parameters corresponding to the wet finger, and receiving N second fingerprint images based on the N sets of CAC parameters corresponding to the wet finger, when the finger of the user is in the steady state and the finger of the user is the wet finger, wherein N is an integer greater than 1;
- determining a first target fingerprint image, and matching the first target fingerprint image, wherein the first target fingerprint image is a fingerprint image with the best image quality among the N second fingerprint images; and
- unlocking the terminal device when the first target fingerprint image is matched;
- wherein the determining whether the finger of the user is a wet finger based on the M first fingerprint images comprises:
    - determining a second target fingerprint image, wherein the second target fingerprint image is a fingerprint image having the best clarity among the M first fingerprint images;
    - acquiring K underlying data configured to generate the second target fingerprint image, wherein K is an integer greater than 1;
    - determining that the finger is the wet finger, when a number of underlying data in a default range among the K underlying data is greater than or equal to a first threshold; and
    - determining that the finger is not the wet finger, when the number of the underlying data in the default range among the K underlying data is less than the first threshold; or
- wherein the determining whether the finger of the user is a wet finger based on the M first fingerprint images comprises:
    - determining a third target fingerprint image, wherein the third target fingerprint image is a fingerprint image having the best clarity among the M first fingerprint images;
    - extracting feature points of the third target fingerprint image;
    - determining that the finger is the wet finger, when the number of the feature points of the third target fingerprint image is less than a second threshold; and
    - determining that the finger is not the wet finger, when the number of the feature points of the third target fingerprint image is greater than or equal to the second threshold.

10. The computer readable storage medium of claim 9, wherein the matching the first target fingerprint image comprises:
- extracting overall features of the first target fingerprint image, and comparing the overall features of the first target fingerprint image with overall features of a pre-stored fingerprint template of the terminal device;
- extracting local features of the first target fingerprint image and comparing the local features of the first target fingerprint image with local features of the pre-stored fingerprint template, when a similarity between the overall features of the first target fingerprint image and the overall features of the pre-stored fingerprint template is greater than or equal to a third threshold; and
- determining that the first target fingerprint image is matched, when a similarity between the local features of the first target fingerprint image and the local features of the pre-stored fingerprint template is greater than or equal to a fourth threshold.

11. The computer readable storage medium of claim 9, wherein the programs are further operable with the processor to carry out actions comprising:
- acquiring a current location of the terminal device; and
- wherein when the current location of the terminal device belongs to a preset type, the unlocking the terminal device comprises:
    - acquiring and displaying service information associated with the current location of the terminal device.

12. The computer readable storage medium of claim 10, wherein the programs are further operable with the processor to carry out actions comprising:
- acquiring a current location of the terminal device; and
- wherein when the current location of the terminal device belongs to a preset type, the unlocking the terminal device comprises:
    - acquiring and displaying service information associated with the current location of the terminal device.

* * * * *